June 17, 1930.  H. J. D. COOKE  1,765,129
BEVERAGE MIXER
Filed Oct. 23, 1926
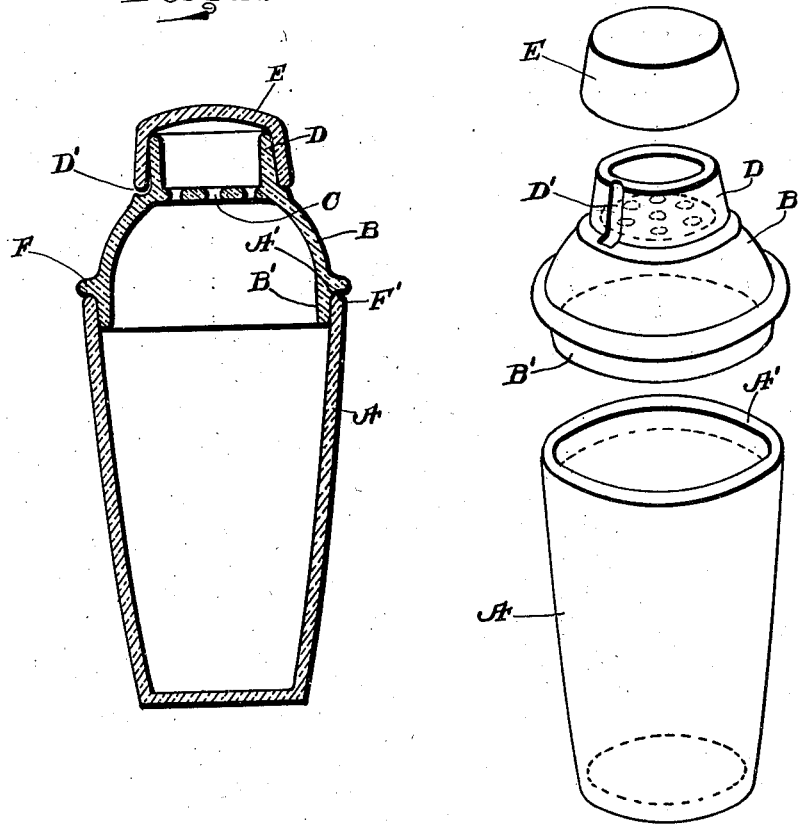
INVENTOR.
Hugh John Dunne Cooke,
BY
Geo. P. Kimmel
ATTORNEY.

Patented June 17, 1930

1,765,129

UNITED STATES PATENT OFFICE

HUGH JOHN DUNNE COOKE, OF LONDON, ENGLAND

BEVERAGE MIXER

Application filed October 23, 1926, Serial No. 143,720, and in Great Britain and Australia October 23, 1925.

This invention relates to devices for mixing beverages or other drinks and has for its object to provide an improved form of device.

According to this invention the device comprises a container having a detachable top or cover provided with a pouring neck and a cap adapted to close the mouth of the neck when the device is being shaken, the container, the cover and the cap all being formed wholly of glass. Preferably the cover has a strainer for the liquid and to this end may be provided with an internal transverse diaphragm conveniently integral with the cover and having a number of perforations therein. The pouring neck which preferably projects centrally from the cover is conveniently of cylindrical shape and adapted to receive the cap which fits over or into it. In some cases a groove is provided, for example either on the outside of the pouring neck or on the inside of the cap, to permit escape of gas from the interior of the device when the cap and cover are in position.

A mixing device according to this invention is illustrated by way of example in the accompanying drawings in which Figure 1 is a vertical section showing the parts assembled, and Figure 2 is a perspective view of the three parts separated.

The device comprises a glass container A, for example in the shape of a drinking tumbler, the open end of which is adapted to be engaged by a substantially dome-shaped cover B also formed of glass. The cover is conveniently provided with a ground spigot B' adapted to fit within the upper end of the container which is correspondingly ground at A' so as to form a substantially fluid-tight joint between the container and the cover. Spaced from the lower end thereof, the cover is formed with a circumferentially extending, outwardly directed flange F, the lower surface of which is concaved as indicated at F' and forms an arcuate extension for the ground outer surface of the spigot B' and in connection therewith provides a concave seat for the convex inner surface A' of the upper edge of the container, thereby forming a fluid tight joint of arcuate contour. The cover is provided with an internal transverse diaphragm C formed integral therewith and perforated to constitute a strainer and also with a pouring neck D. The neck D is externally ground and adapted to be closed by a cap E which fits over it, the cap being correspondingly internally ground so as to form a substantially fluid-tight joint with the pouring neck.

A groove D' is provided on the outside of the pouring neck to form a passage through which gas can escape from the interior of the device when the cover B and cap E are in position. If desired the groove may be formed on the inner wall of the cap instead of on the neck as shown.

It is to be understood that the container, the cover and the cap may be formed either of plain glass as illustrated or of cut glass or from glass otherwise decorated. Further the cover may if desired fit over instead of into the open end of the container and the shape and dimensions of the whole may be varied to suit different tastes without departing from this invention.

Having now particularly described and ascertained the nature of my said invention and in what manner the same is to be performed, I declare that what I claim is:—

A beverage shaker comprising, an open top container having its upper edge ground to present a convex inner surface, a dome-shaped cover having a flat perforated top and further having its lower end ground for reception within the upper end of said container to provide a fluid-tight, spigot-joint therebetween, a circumferentially extending, outwardly directed flange formed on said cover with the lower surface of said flange formed in continuation of the ground surface of the lower end of said cover and coacting therewith to form a concave seat for the convex inner surface of the upper edge of said container to provide an arcuate extension for said fluid tight joint, said cover having an outwardly directed bead in horizontal alinement with said perforated top, said bead formed in its upper face with a transversely extending groove, an open top, imperforate neck formed on the upper end of said cover, and a cap detachably fitting over said neck for closing the open top thereof and seating on said head, said neck being formed in its outer surface with a vertical groove extending throughout the entire height thereof and opening into the groove in the upper face of said head.

Dated this 13th day of October, 1926.

HUGH JOHN DUNNE COOKE.